United States Patent Office 2,821,516
Patented Jan. 28, 1958

2,821,516

BUTYL RUBBER SILICA COMPOSITION AND METHOD OF PREPARATION

Ralph F. Wolf, Akron, Ohio, assignor to Columbia-Southern Chemical Corporation, Allegheny County, Pa., a corporation of Delaware No Drawing. Application September 27, 1954
Serial No. 458,663

10 Claims. (Cl. 260—41.5)

This invention relates to the production of silica reinforced rubber compositions from isobutylene rubber-like polymers, including homopolymers and copolymers, such as "butyl rubber." Prior to the present invention the provision of butyl rubber reinforced with siliceous pigment has been complicated by the fact that such rubbers in the vulcanized state conventionally exhibit a serious bloom. This bloom manifests itself in the form of a fine white powder on the surface of the rubber which is produced. While some portion of the powder can be wiped off, further powder appears to exude from the surface of the rubber on standing. Consequently, the resulting rubber products are unsightly and the full color of the rubber is thereby impaired. This is a serious objection since the use of siliceous pigments, which are intrinsically white, permits the production of nonblack rubber compositions which are highly desirable for commercial use. At the same time, however, the presence of the bloom on the surface of the rubber is very unsightly.

According to the present invention it has been found that this bloom may be avoided in butyl rubber stocks which contain no carbon black by effecting a vulcanization of the butyl rubber-siliceous pigment composition containing a lower than normal concentration of elemental sulphur and up to about 2.5 parts by weight of a dimorpholine polysulfide, such as 4,4′ dithiodimorpholine.

The term "butyl rubber" is intended to include polymers of isobutylene and copolymers of isobutylene and a diolefin of the group consisting of butadiene, isoprene, dimethyl butadiene, pentadiene, cyclopentadiene, and piperylene, such as are described in U. S. Patent No. 2,442,068. Such polymers normally contain 70 to 99 percent of the isobutylene and 30 to 1 percent by weight of the diolefin. These copolymers are produced by a low temperature polymerization, for example, at a temperature of substantially minus 95° C.

The siliceous pigments which are used in accordance with the present invention are finely divided pulverulent materials containing in excess of about 55 to 60 percent $SiO_2$ by weight on the water-free basis and having an average ultimate particle size below 0.1 micron, preferably in the range of 0.01 to 0.05 micron. Typical pigments of this character are finely divided silica, calcium silicate, magnesium silicate, sodium aluminum silicate, sodium calcium aluminum silicate, aluminum silicate, and the like.

By far the strongest rubber compositions have been produced using finely divided silica which contains an excess of about 85 to 90 percent $SiO_2$ on the water-free basis. Such silicas usually have a surface area in the range of about 50 to 250 square meters per gram, the best being in the range of 90 to 225 square meters per gram. They may contain small amounts of metallic components such as CaO, $Al_2O_3$, MgO, ZnO or the like, usually in chemical combination. Typical silica pigments of the type contemplated are described in an application of Edward M. Allen, Serial No. 283,721, filed April 22, 1952.

Typical methods of preparing silica of this character are as follows:

*Example I*

Streams of aqueous sodium silicate solution containing 100 grams per liter of $SiO_2$ as $Na_2O(SiO_2)_{3.36}$, and calcium chloride solution containing 100 grams per liter of $CaCl_2$ and 30 to 40 grams per liter of sodium chloride were fed directly into the central area of a centrifugal pump at 150° F.

The rates of flow were adjusted so that calcium chloride was approximately 10 percent in excess over the stoichiometric quantity required for reaction, and so that the amount of liquid supplied to the pump was about 25 percent below the output capacity of the pump. In consequence, the solutions were subjected to turbulent intermixing in the pump.

The slurry of calcium silicate thus produced was introduced into a tank and sufficient hydrochloric acid solution containing 28 percent by weight of HCl was added, with stirring, to reduce the pH of the slurry to 2. Thereupon, sufficient sodium hydroxide solution containing 40 percent by weight of NaOH was added to raise the pH of the slurry to 7.5. The precipitated silica was recovered by decantation and filtration, and was dried in an oven at a drying temperature of 120 to 140° C. for 12 hours. The free water content of the product was within the range of 3 to 8 percent by weight of the pigment.

*Example II*

An aqueous solution of sodium silicate was prepared by diluting 5.88 liters of sodium silicate containing 298 grams per liter of $SiO_2$ as sodium silicate having the composition $Na_2O(SiO_2)_{3.36}$, with sufficient water to produce 20.7 gallons of solution. A further solution was made by dissolving 1220 grams of calcium chloride and 320 grams of sodium chloride in 16.0 gallons of water. Streams of these aqueous solutions were fed directly into the central area of a centrifugal pump, proportioning the rates of flow so that calcium chloride remained in excess over the stoichiometric quantity required for reaction with the sodium silicate at all times. After mixing of the two solutions was complete, 475 grams of ammonium chloride was added to the resulting calcium silicate slurry and the slurry was thereafter boiled for about 4 hours, at which time the odor of ammonia was very faint. Thereafter, the slurry was washed and filtered, and was dried at a temperature of about 120° C. A white friable product having the following composition was produced:

| | Percent by weight |
|---|---|
| Ignition loss | 13.67 |
| $SiO_2$ | 77.84 |
| $R_2O_3$ (iron and aluminum) | 1.30 |
| CaO | 5.88 |
| MgO | 1.36 |

*Example III*

Twenty-six hundred gallons of sodium silicate solution containing 18 grams per liter of NaCl and 20 grams per liter of $Na_2O$ as the sodium silicate, $Na_2O(SiO_2)_{3.3}$, was placed in a 4000-gallon tank. Carbon dioxide gas containing 10 percent by volume of $CO_2$, the balance being nitrogen, was introduced into the solution over a period of 3 hours while holding the solution at 30° C. at a rate sufficient to react with all of the sodium silicate and convert 20–25 percent of the $Na_2O$ content thereof to bicarbonate. Thereafter, the resulting slurry was boiled for one hour, filtered, and washed. The filter cake was reslurried and a solution of $Al_2(SO_4)_3 18H_2O$, in quantity sufficient to introduce into the slurry ½ percent of $Al_2$ based upon the weight of $SiO_2$ in the slurry, was added to the slurry. Thereafter, the slurry was stirred briefly and enough hydrochloric acid was added to adjust the pH to 5.7. The resulting slurry was filtered and the filter cake dried.

Example IV

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F. ±5°. Carbon dioxide gas containing 10.0 to 10.8 percent of $CO_2$, the balance being nitrogen and air, is introduced into the solution at a gas temperature of 115 to 145° F. at a rate sufficient to provide 1250 cubic feet of the carbon dioxide gas per minute (measured at 760 millimeters' pressure and 0° C.). This gas is introduced directly under a turbo agitator in a manner to achieve uniform distribution of gas, and the mixture is vigorously agitated. Carbon dioxide introduction is continued at this rate for 8½ hours, at which time about 120 to 140 percent of the theoretical amount of $CO_2$ has been introduced. After this period of 8½ hours, the rate of introduction of carbon dioxide is reduced to 400 cubic feet per minute and the solution is boiled for 1½ hours. Sixteen hundred gallons of the boiled slurry containing 6.4 grams per liter of $Na_2O$ was placed in a tank and 168 pounds of aluminum sulphate $Al_2(SO_4)_3 18H_2O$ was added. Hydrochloric acid was added to adjust the pH of the slurry to 5.7, and the silica was recovered and dried.

The morpholine polysulfides are compositions having the following formula:

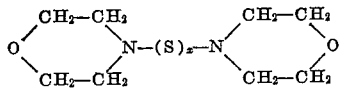

where $x$ is a small whole number in excess of 1 but rarely in excess of 5. Of particular interest in this regard is the compound 4,4' dithiodimorpholine which is manufactured and sold to the trade as Sulfasan R by the Monsanto Chemical Company.

The amount of morpholine polysulfide which may be used according to the present invention depends to some degree upon the degree of vulcanization desired. Usually, this amount will range between 0.5 to 2.5 parts by weight per 100 parts of the butyl rubber. In conjunction with the morpholine polysulfide, it is necessary to use a small amount, less than that which will give a good cure and which will produce bloom, usually ranging from 0.75 to 1.5 parts by weight of elemental sulphur per 100 parts of rubber.

The amount of siliceous pigment used normally ranges from 10 to 80 parts by weight per 100 parts by weight of polyisobutylene polymer.

In the practice of the invention, the butyl rubber, the silica pigment, elemental sulphur, and morpholine polysulfide are milled together in the manner conventional for milling rubber stock. Other conventional components normally incorporated in butyl rubber stocks, such as hydrocarbon softener, accelerators, plasticizers, and the like, may be milled into the stock at the same time or subsequently. Thereafter, the milled composition is sheeted out and used in accordance with standard accepted procedures. Vulcanization of the product is effected at conventional temperatures, for example, 300 to 350° F.

The following example is illustrative:

Example A

In this example, the copolymer of isobutylene and isoprene, known as GR-I 15, was used. This is a product of the copolymerization of 97.5 parts of isobutylene and 2.5 parts of isoprene prepared at a low temperature. Compounds were prepared according to the following formulations:

|  | Compound A | Compound B |
|---|---|---|
| GR-I 15 (Butyl Rubber) | 100 | 100 |
| Zinc Oxide | 5 | 5 |
| Silica prepared as in Example I | 39 | 39 |
| Iron Oxide | 2 | 2 |
| Methyl Tuads (Tetramethyl thiuramdisulfide) | 2 | 2 |
| Sulfur | 2 | 1 |
| Sulfasan R (4,4 dithiodimorpholine) | | 1.5 |
| Diethylene Glycol | 2.5 | 2.5 |
| Paraffin | 0.75 | 0.75 |
| BxDC (Butoxyethyl diglycol carbonate) | 1 | 1 |

Compound A which contained 2 parts by weight of elemental sulphur exhibited a heavy bloom after vulcanization at a temperature of 320° F. for 15 minutes. Compound B exhibited no bloom whatsoever.

Other formulations coming within the scope of this invention are the following:

Example B

| | Parts by weight |
|---|---|
| GR-I | 100.0 |
| Silica prepared as in Example IV | 39.0 |
| ZnO | 5.0 |
| Tellurac | 1.0 |
| Zenite | 1.0 |
| Eelemental sulphur | 1.0 |
| Dimorpholine disulfide | 1.5 |
| Diethylene glycol | 2.5 |
| Paraffin | 0.75 |
| Diethylene glycol bis (butoxyethyl carbonate) | 1.0 |

Example C

| | Parts by weight |
|---|---|
| GR-I-15 | 100.0 |
| Silica | 39.0 |
| Zinc oxide | 5.0 |
| Methyl tuads | 2.0 |
| Sulphur | 1.0 |
| Tetrathiodimorpholine | 0.6 to 1.25 |
| Diethylene glycol | 1.5 |
| Paraffin | 0.75 |
| BxDC | 1.0 |
| Iron oxide | 2.0 |

Although the present invention has been described with reference to the specific details of certain embodiments, it is not intended that such embodiments shall be regarded as limitations upon the scope of the invention except insofar as included in the accompanying claims.

What is claimed:

1. A vulcanizate of a copolymer containing 70 to 99 percent by weight of isobutylene and 30 to 1 percent by weight of a diolefin, a siliceous reinforcing pigment, 0.5 to 1.5 parts by weight of elemental sulphur, and up to 2.5 parts by weight of a dimorpholine polysulfide per 100 parts by weight of the copolymer.

2. The vulcanizate of claim 1 wherein the siliceous reinforcing pigment is finely-divided silica.

3. The vulcanizate of claim 1 wherein the siliceous reinforcing pigment is finely-divided calcium silicate.

4. The vulcanizate of claim 1 wherein the siliceous reinforcing pigment is finely-divided sodium aluminum silicate.

5. The vulcanizate of claim 1 wherein the siliceous reinforcing pigment is finely-divided sodium calcium aluminum silicate.

6. The vulcanizate of claim 1 wherein the siliceous reinforcing pigment is finely-divided aluminum silicate.

7. A vulcanizate of a copolymer containing 70 to 99 percent by weight of isobutylene and 30 to 1 percent by weight of a diolefin, a siliceous reinforcing pigment, 0.5 to 1.5 parts by weight of elemental sulphur, and up to 2.5 parts by weight of 4,4' dithiodimorpholine per 100 parts by weight of the copolymer.

8. The rubber of claim 7 wherein the copolymer contains about 97.5 parts by weight of isobutylene and 2.5 parts by weight of isoprene.

9. A method of preparing a synthetic rubber which comprises compounding together a copolymer containing 70 to 99 percent by weight of isobutylene and 30 to 1 percent by weight of a diolefin, a siliceous reinforcing pigment, and 0.5 to 1.5 parts by weight of elemental sulphur, and up to 2.5 parts by weight of a dimorpholine polysulfide per 100 parts of the copolymer, and vulcanizing the resulting compoistion.

10. The process of claim 9 wherein the copolymer contains 97.5 parts by weight of isobutylene and 2.5 parts by weight of isoprene.

References Cited in the file of this patent
UNITED STATES PATENTS

| | | |
|---|---|---|
| 2,325,735 | Blake | Aug. 3, 1943 |
| 2,665,264 | Brooks et al. | Jan. 5, 1954 |
| 2,744,879 | Ladd | May 8, 1956 |

OTHER REFERENCES

Wolf: Rubber Age, June 1954, pages 389–395.